United States Patent
Bonnamy et al.

(10) Patent No.: US 11,816,320 B2
(45) Date of Patent: *Nov. 14, 2023

(54) PAGINATED GROWING WIDGETS

(71) Applicant: Business Objects Software Ltd., Dublin (IE)

(72) Inventors: Alain Bonnamy, Paris (FR); Christophe Ricard, L'Haÿ-les-Roses (FR)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,099

(22) Filed: Jan. 23, 2023

(65) Prior Publication Data
US 2023/0152955 A1 May 18, 2023

Related U.S. Application Data

(63) Continuation of application No. 17/155,454, filed on Jan. 22, 2021, now Pat. No. 11,567,645.

(51) Int. Cl.
*G06F 3/048* (2013.01)
*G06F 3/04845* (2022.01)
(Continued)

(52) U.S. Cl.
CPC ...... *G06F 3/04845* (2013.01); *G06F 3/04883* (2013.01); *G06F 9/45529* (2013.01); *G06F 9/547* (2013.01)

(58) Field of Classification Search
CPC ............. G06F 3/04845; G06F 3/04883; G06F 9/45529; G06F 9/547
See application file for complete search history.

(56) References Cited

U.S. PATENT DOCUMENTS 7,971,155 B1 * 6/2011 Yoon ..................... G06F 3/0482
715/843
10,303,325 B2 5/2019 Jarrett et al.
(Continued)

FOREIGN PATENT DOCUMENTS

WO WO-2012150963 A1 * 11/2012 ............. G06F 3/048

OTHER PUBLICATIONS

892 Form dated Oct. 31, 2022 which was received in connection with U.S. Appl. No. 17/155,454.
(Continued)

*Primary Examiner* — Rashawn N Tillery
(74) *Attorney, Agent, or Firm* — Buckley, Maschoff & Talwalkar LLC

(57) ABSTRACT

Computer-readable media, methods, and systems are disclosed for displaying paginated growing widgets. At generation time, a pagination service negotiates widget bounds. The pagination service transmits proposed bounds and a starting index to the growing widgets and receives a number of items that can be displayed as well as updated bounds for all items that can be displayed. The pagination service creates a cache entry including a widget identifier, updated widget bounds, and a starting and ending widget data item index. If a particular page is not present in the widget pagination cache, the pagination service performs another bounds negotiation. At display time, the pagination service instructs each of the paginated growing widgets to render updated widget data items based on a corresponding widget pagination cache entry, without reprocessing a document object model associated with a front-end application on which the paginated growing widgets are displayed.

20 Claims, 6 Drawing Sheets

(51) Int. Cl.
*G06F 9/54* (2006.01)
*G06F 9/455* (2018.01)
*G06F 3/04883* (2022.01)

(56) References Cited

U.S. PATENT DOCUMENTS

| | | | |
|---|---|---|---|
| 2003/0101291 A1* | 5/2003 | Mussack | G06F 9/541 |
| | | | 709/201 |
| 2010/0077344 A1 | 3/2010 | Gaffney et al. | |
| 2010/0153865 A1* | 6/2010 | Barnes | H04L 67/10 |
| | | | 715/762 |
| 2010/0295789 A1 | 11/2010 | Shin et al. | |
| 2011/0161863 A1 | 6/2011 | Rainisto | |
| 2014/0040724 A1* | 2/2014 | Krueger | G06F 40/106 |
| | | | 715/234 |
| 2014/0208203 A1* | 7/2014 | Tang | G06F 40/106 |
| | | | 715/252 |
| 2014/0337289 A1* | 11/2014 | Mulukutla | G06F 16/273 |
| | | | 707/634 |
| 2017/0293593 A1* | 10/2017 | Cowie | G06F 3/0482 |
| 2018/0059881 A1 | 3/2018 | Agboatwalla et al. | |
| 2019/0235843 A1* | 8/2019 | Wu | G06F 8/35 |
| 2020/0348822 A1 | 11/2020 | Dascola et al. | |
| 2022/0398306 A1* | 12/2022 | Misra | G06F 9/451 |

OTHER PUBLICATIONS

Notice of Allowance dated Oct. 31, 2022 which was received in connection with U.S. Appl. No. 17/155,454.

\* cited by examiner

PAGINATED GROWING WIDGETS

CROSS REFERENCE

The present application is a non-provisional continuation of and claims priority to U.S. application Ser. No. 17/155,454, which was filed on Jan. 22, 2021, and is entitled "PAGINATED GROWING WIDGETS", the entire content of which is incorporated by reference herein in its entirety.

TECHNICAL FIELD

Embodiments generally relate to the presentation of information by way of a formatted and organized reporting interface to data warehouse information with paginated growing widgets on a software-as-a-service reporting platform.

Some software-as-a-service reporting platforms have historically displayed huge datasets in scrollable, constrained areas within a fixed-size user interface component within a browser window, typically displaying data in scrollable rows and columns. Scrolling inside the scrollable user interface component was the only way to browse content to a full extent of the underlying dataset. If a dataset were made up of thousands of records, not only would the page take a significant period of time to load but scrolling through the large data set to find the desired portions of the dataset would be time consuming and burdensome. Moreover, in scrolling through the large dataset, a concept of discrete blocks or pages of the data was lacking, making it unwieldly to print the data or convert it consistently and repeatably to a document format made up of pages such as a portable document format (PDF), etc. Finally, sufficiently large datasets cannot completely be loaded into such a scrollable user interface component, due to query time, and browser memory constraints, such that limits must be placed on the number of records returned in a dataset corresponding to a particular query. Accordingly, with particularly large datasets, relevant portions of a query could be truncated and therefore not be present in the scrolling user interface control corresponding to the returned dataset.

SUMMARY

Disclosed embodiments address such problems by providing one or more non-transitory computer-readable media storing computer-executable instructions that, when executed by a processor, perform a method for populating and rendering one or more paginated growing widgets in a front-end display application, the method comprising: causing a pagination service to perform a widget bounds negotiation with each of the paginated growing widgets for at least one page in a paginated report, the widget bounds negotiation comprising steps of: transmitting proposed bounds and a starting widget data index to the paginated growing widgets, receiving, from the paginated growing widgets: a number of widget data items that each of the paginated growing widgets can display, updated bounds actually used in displaying the widget data items, and a pagination completion indication regarding whether an entire widget dataset can be displayed within the updated bounds, creating a widget pagination cache entry in a widget pagination cache, the cache entry including: a widget identifier corresponding to each of the paginated growing widgets, the updated widget bounds, a starting widget data item index and an ending widget data item index, causing the front-end display application to implement pagination controls, responsive to a user page navigation event, navigating the paginated report to a particular page, determining whether the particular page is present in the widget pagination cache, causing the pagination service to perform the widget bounds negotiation for the particular page where the particular page is not present in the widget pagination cache, and instructing each of the paginated growing widgets to render updated widget data items based on a corresponding widget pagination cache entry.

In a second embodiment, the present disclosure illustrates a method for displaying, in a front-end display application, a paginated report having at least one growing table widget, the method comprising: causing a pagination service to perform a widget bounds negotiation with the growing table widget for at least one page in the paginated report, the widget bounds negotiation comprising steps of: transmitting proposed table bounds and a starting table row to the growing table widget, receiving, from the growing table widget: a number of table data items that the growing table widget can display, updated table bounds actually used in displaying the table data items, and a pagination completion indication regarding whether an entire dataset can be displayed within the updated table bounds, creating a report pagination cache entry in a report pagination cache, the cache entry including: a widget identifier corresponding to the growing table widget, the updated table bounds, a starting table row and an ending table row, causing the front-end display application to implement report pagination controls, responsive to a user page navigation event, navigating the paginated report to a particular page, determining whether the particular page is present in the report pagination cache, causing the pagination service to perform the widget bounds negotiation for the particular page where the particular page is not present in the report pagination cache, and instructing the growing table widget to render updated table data items based on a corresponding report pagination cache entry.

In a third embodiment, the present disclosure illustrates a system comprising at least one processor and at least one non-transitory memory storing computer executable instructions that when executed by the processor cause the system to carry out actions comprising: transmitting, to a front-end user device, computer executable instructions to cause a front-end display application to cause a pagination service to perform a widget bounds negotiation with a plurality of paginated growing composite widgets for at least one page in a paginated report, the widget bounds negotiation comprising steps of: transmitting proposed bounds and a starting widget data index to the paginated growing composite widgets, receiving, from the paginated growing composite widgets: a number of widget data items that each of the paginated growing composite widgets can display, updated bounds actually used in displaying the widget data items; and a pagination completion indication regarding whether an entire widget dataset can be displayed within the updated bounds, creating a widget pagination cache entry in a widget pagination cache, the cache entry including: a widget identifier corresponding to each of the paginated growing composite widgets, the updated widget bounds, a starting widget data item index and an ending widget data item index, transmitting, to a front-end user device, computer executable instructions to cause the front-end display application to implement pagination controls, responsive to a user page navigation event, navigating the paginated report to a particular page, determining whether the particular page is present in the widget pagination cache, transmitting, to a front-end user device, computer executable instructions to cause the pagination service to perform the widget bounds negotiation for the particular page where the particular page is not present in the widget pagination cache, and transmitting, to a front-end user device, computer executable instructions to instruct each of the paginated growing widgets to render updated widget data items based on a corresponding widget pagination cache entry.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
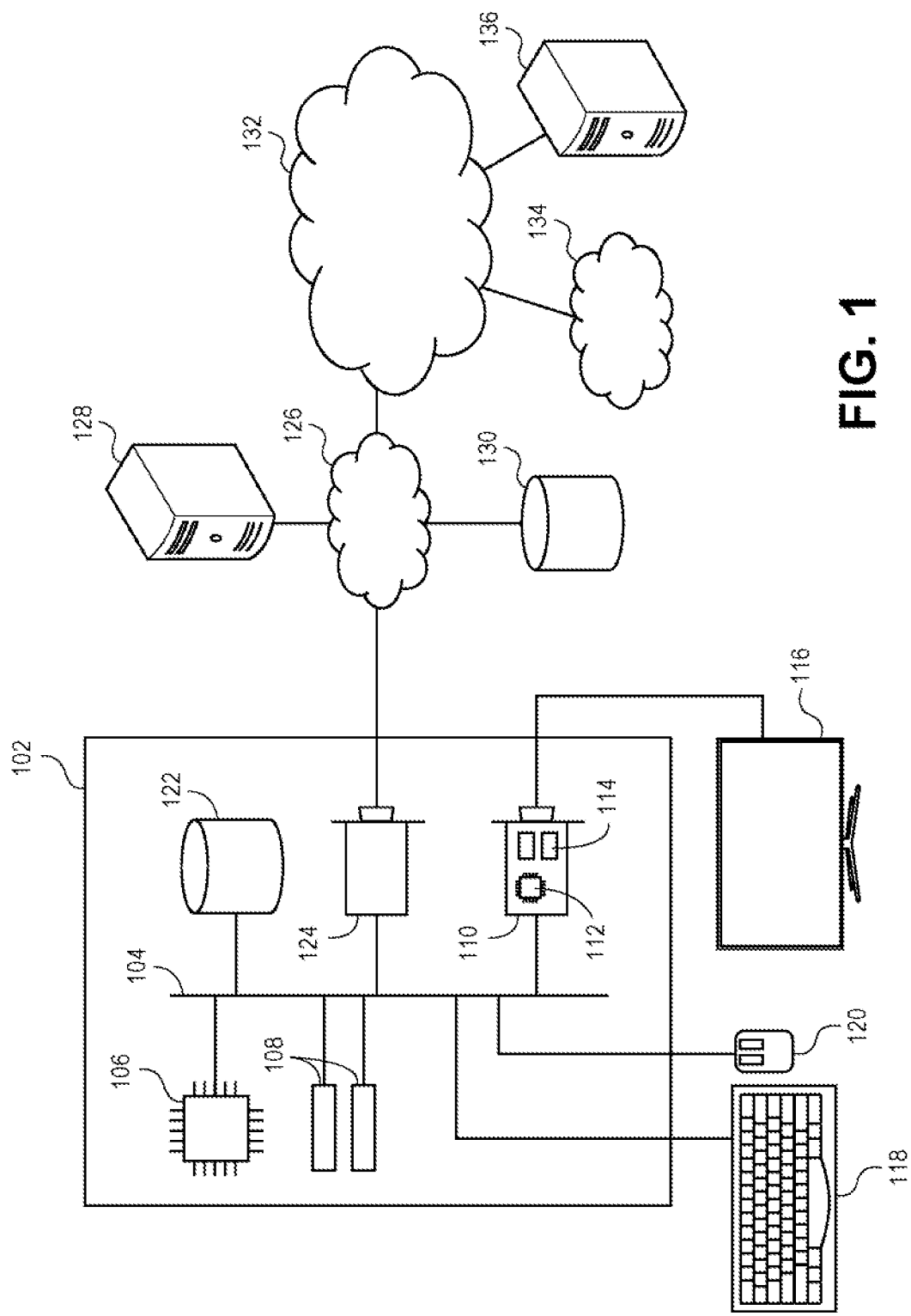
FIG. 1 depicts an exemplary hardware platform for certain embodiments.

The drawing figures do not limit the invention to the specific embodiments disclosed and described herein. The drawings are not necessarily to scale, emphasis instead being placed upon clearly illustrating the principles of the disclosure.

DETAILED DESCRIPTION

In some embodiments, a two-phase pagination approach is employed. Pagination is a mechanism that enables a user interface to present an arbitrarily long dataset across multiple virtual reporting pages within a growing widget such as a growing table widget or a composite widget, otherwise known as a section. A section is a composite widget containing further analytics such as related sub-widgets that are updated within the section based on controls such as filters and expand and contract operations on hierarchical data. Some embodiments involve assembling an internal representation of the pages in which a block of data is associated with each reporting page. The generation phase involves assembly of blocks of metadata corresponding to reporting pages. In some embodiments, the blocks of metadata are collected in a cache such as a JavaScript Object Notation (JSON) list or other JSON entity that is updated when: (i) a not-yet-requested reporting page is requested for the first time; or (ii) when a significant change occurs in the structure of the document which invalidates computations made up to that point in the report viewing session. These events may occur, for example, when hierarchical data representations are expanded or contracted. Additionally, the paginated data will change when a filter is applied or removed. When a user navigates to a reporting page that has already been generated and which block of metadata is already present in the cache, the bounds of existing widgets are updated in memory to match the block of metadata found in the cache for the relevant reporting page or pages. This is the playback phase. The cost of obtaining metadata corresponding to a reporting page is therefore only incurred once per page, during the generation phase. Once added to the cache, pages can be read again when accessing a particular reporting page going forward. When a page is already present in the cache, only graphical operations for updating the paginated widget need to be performed.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

Turning first to FIG. 1, an exemplary hardware platform for certain embodiments is depicted. Computer 102 can be a desktop computer, a laptop computer, a server computer, a mobile device such as a smartphone or tablet, or any other form factor of general- or special-purpose computing device containing at least one processor. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, such as non-transitory computer readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2:
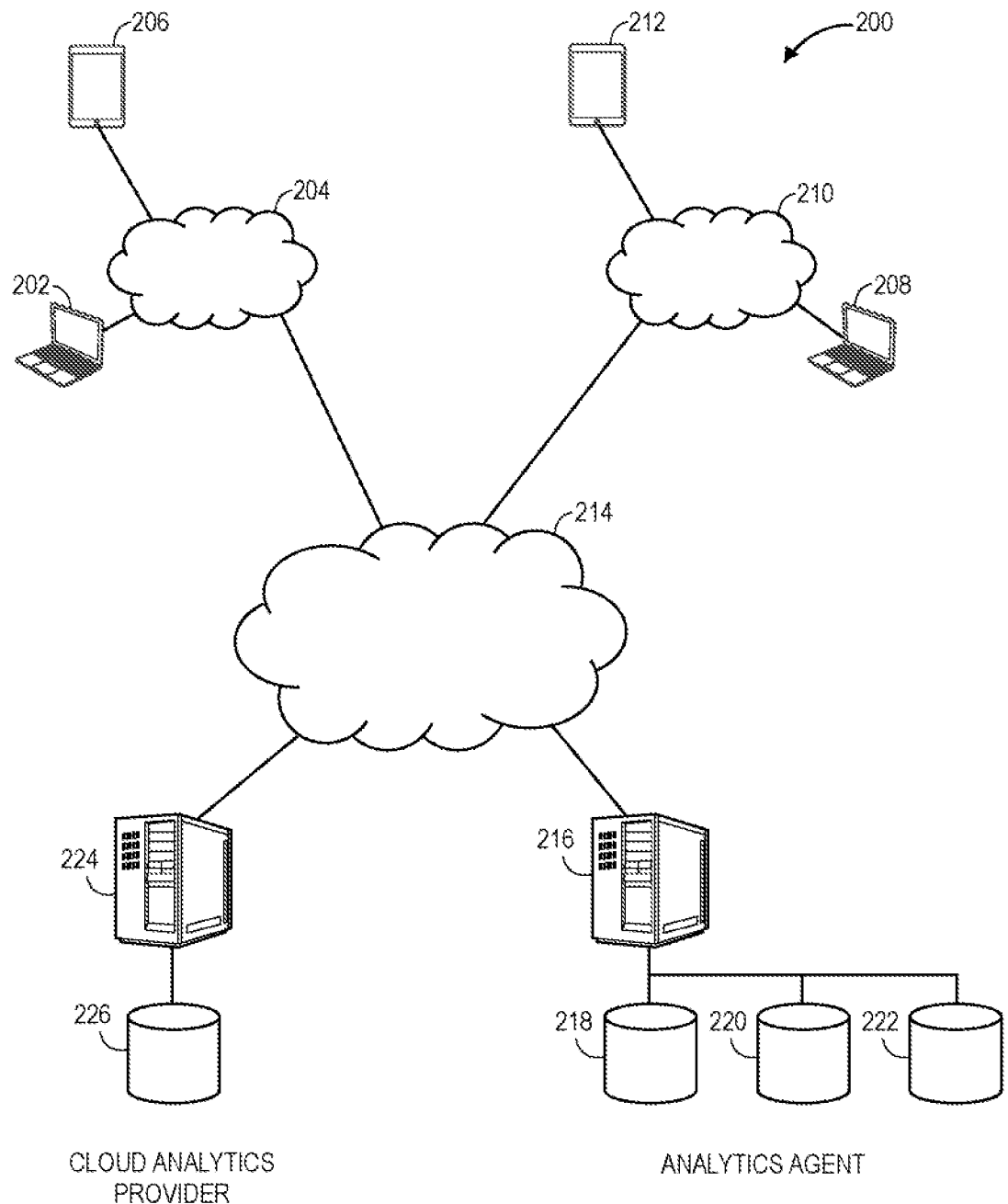
FIG. 2 depicts components of a system for carrying out certain embodiments.

Turning now to FIG. 2, an exemplary diagram illustrating components of a system for carrying out embodiments is depicted and referred to generally by reference numeral 200. System 200 provides a mechanism for populating and rendering a paginated widget in a software-as-a-service analytics platform. For example, system 200 may provide a reporting and/or planning interface to data warehouse information with paginated data table widgets. As depicted in system 200, designer device 202 is used by a report designing user to access and interact with a report designer user interface associated with system 200. Designer device 202 may be any form of computing device described above with respect to FIG. 1. For example, designer device 202 may be a desktop computer, laptop computer, tablet computer (such as depicted designer tablet device 206), or a smartphone. Designer device 202 may access components of system 200 by way of designer local network 204. Designer local network 204 may be any kind of a wired or wireless data network, such as Ethernet as defined by any of the IEEE 802.3 family of standards, Wi-Fi as defined by the IEEE 802.11 family, or any mobile data network standard.

Also depicted is viewer device 208, which may likewise be any form of computing device described above with respect to FIG. 1, such as viewer tablet device 212. In some embodiments, viewer tablet device is a generally rectangular mobile tablet device or smart phone. By contrast with designer device 202, viewer device 208 is used by a user of system 200, who for the purposes of illustration may view and interact with previously designed reports that have been designed by a user of designer device 202. For example, such a viewing user may be an employee of the company for which the designing user has designed reports. Viewer device 208 may access components of system 200 by way of viewer local network 210. Like designer local network 204, viewer local network 210 may be any kind of a wired or wireless data network as described above. Although designer device 202 and viewer device 208 are described as having distinct designing and viewing roles, it is understood that viewer device 202 may also be used to design reports similarly to designer device 202. Similarly, a designing user who uses designer device 202 to design reports may also use designer device 202 to view reports, whether previously designed by the designing user or by any other user of the reporting platform. This is particularly useful when the designing user is testing and validating reports as they are being designed.

In some embodiments, cloud analytics server 224 functions as an application server of a cloud analytics provider in system 200. For example, cloud analytics server 224 may present a web interface with which users of the cloud analytics provider interact with reports and other content stored in cloud analytics repository 226. Users of system 200 may use devices such as viewer device 208 to interact with other elements of system 200 via the web browser of viewer device 208. Alternatively, or in addition, cloud analytics server 224 may provide a direct client/server interface with which a user may use devices such as viewer device 208 to interact with elements of system 200 via dedicated software. For example, if viewer device 208 is a smartphone or a tablet, the dedicated software may be in the form of a mobile app. As yet another alternative, the user may use dedicated software in viewer device 208 to interact with other components of system 200, where the dedicated software interacts with cloud analytics server 224 via the web interface of cloud analytics server 224 or a web services application programming interface (API) associated with cloud analytics server 224. Generally speaking, and as described in greater detail below, cloud analytics repository 226 stores data associated with reports and other content of the cloud analytics platform. As depicted, cloud analytics server 224 is directly connected to cloud analytics repository 226. However, in various embodiments, cloud analytics repository 226 may be connected via a network such as network 214. For example, cloud analytics repository 226 may be network-attached storage (NAS) or cloud storage.

Analytics agent server 216 provides an interface for a variety of data sources 218, 220, and 222 in system 200. For example, the analytics agent may provide an interface for data contained in a relational database management system, a data warehouse, or any other source of data, whether in the cloud or on-premise. As depicted, Analytics agent server 216 is directly connected to data sources 218, 220, and 222. However, in various embodiments, data sources 218, 220, and 222 may be connected via a network such as network 210. For example, data sources 218, 220, and 222 may be provided with persistent storage taking the form of network-attached storage (NAS) or cloud storage.

The components of system 200 may be interconnected via network 214. For example, network 214 may be public Internet 132 as described in connection with FIG. 1. Alternatively, some or all of the components of system 200 may be interconnected via a local area network (LAN), wide area network, or virtual private network (VPN), which may in turn interconnect to other elements of the system via public Internet 132.

Operation of Embodiments

As used herein "reporting" means providing a human-readable, formatted and organized presentation of data coming from various data sources. A "reporting page" is a rendering of a user interface region rendered at view time by assembling associated content in-memory to provide the user experience of navigating a dataset. A "story page" is a persisted document where users analyze data by building charts, tables, graphs, and using other data visualization tools to tell a story based on the underlying data. "View time" is the time during which actual data is injected in the widgets to provide the final analytics tailored to the current end-user as opposed to the designer. A "widget" is a control element in a graphical user interface (GUI)—usually an element of interaction or passive display. Widgets may comprise other widgets, which are then referred to as sub-widgets.

Figure 3:
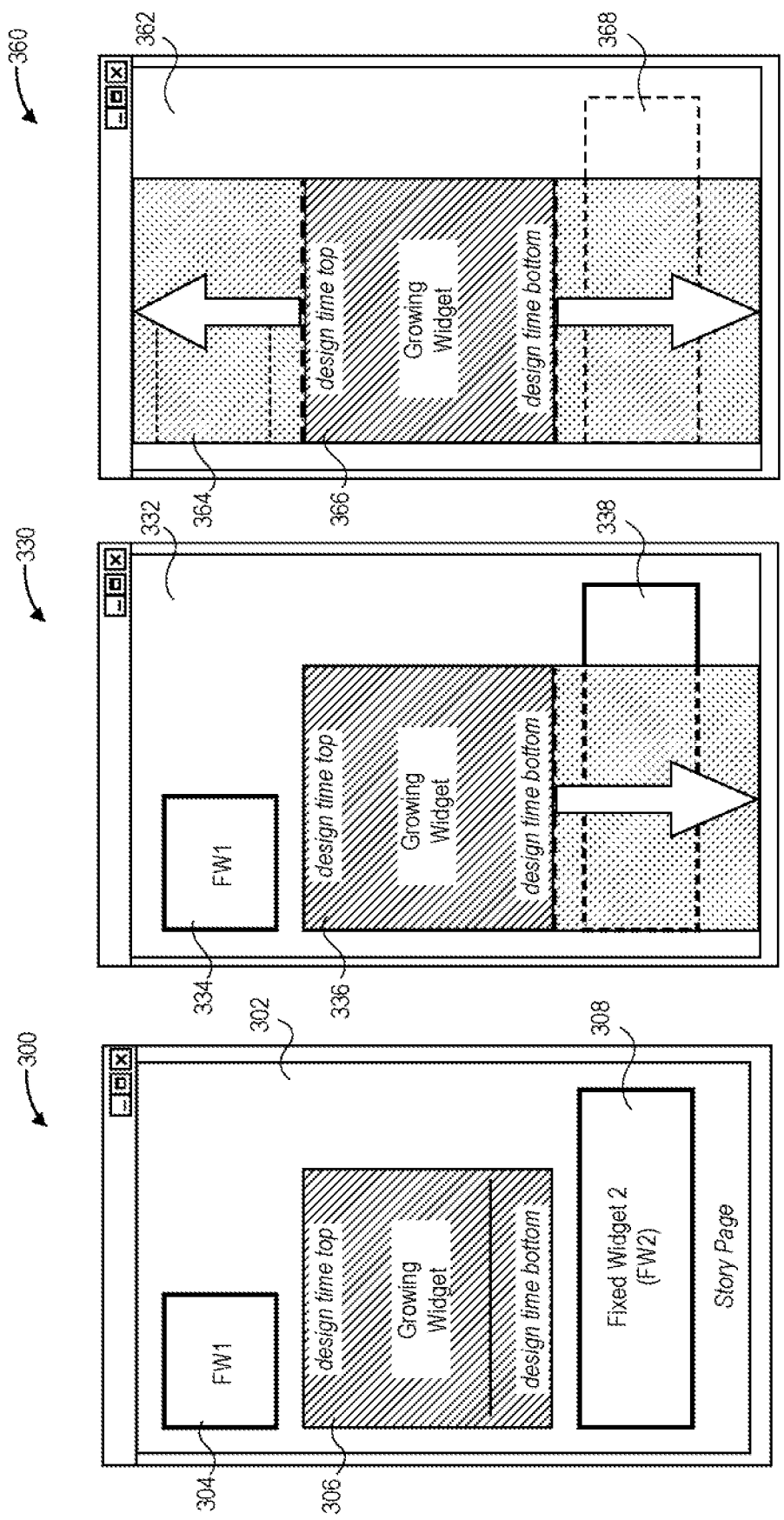
FIGS. 3A-3C depict user interface components for laying out widgets within an exemplary story page.

Turning now to FIGS. 3A-3C, user interface components for laying out widgets within an exemplary story page are depicted and referred to generally by reference numerals 300, 330, and 360. Exemplary user interface component 300 shows a growing widget 306 at design time and is rendered in window 302, in which an analytics designer can format a story page layout with multiple widgets. FIG. 3A illustrates a story page layout rendered in window 302, in which a report designer formats a page layout with multiple widgets. Fixed widgets 304 and 308 are widgets whose bounds do not change over time, for example, an image or a clock. By contrast, growing widget 306 is a widget, whose bounds may change to accommodate variable-length content. In various embodiments, at design time, growing widgets such as growing widget 306 are shown with a constrained top and bottom as it would be displayed at view time if growing widget 306 contained only a small number of rows. In such embodiments, this design-time behavior accommodates placement of other widgets in the story page view.

Turning now to FIG. 3B, in some embodiments, user interface component 330 shows a preview of growing widget 336 at design time and is rendered in window 332, in which an analytics designer can preview a story page layout with multiple widgets with growing widget 336 shown at an initial widget index so that the design time top of growing widget 336 is previewed. In some embodiments, growing widget 336 represents a preview at design time regarding how growing widget 336 would appear at view time. In this preview, fixed widget 338 is partially covered up by growing widget 336. In the preview shown in FIG. 3B, a first page of growing widget 336 is being displayed in growing widget 336 and therefore content is displayed starting from a first data item associated with growing widget 336. The preview indicates that the growing widget 336 will be instructed to expand downward to fill the space available in the window in which growing widget 336 is rendered.

Turning now to FIG. 3C, in some embodiments, user interface component 360 shows a preview of growing widget 366 at design time and is rendered in window 362, in which an analytics designer can preview a story page layout with multiple widgets with growing widget 366 shown at an intermediate widget index so growing widget 366 is previewed with a top of the growing widget extending to a top of window 362 in which the growing widget 366 is rendered. In some embodiments, growing widget 336 represents a preview at design time regarding how growing widget 366 would appear at view time. In this preview, fixed widget 364 remains present in a document object model (DOM) associated with a front-end display application on which the report is displayed but is hidden from display. Similarly, fixed widget 368 is hidden as well while structurally remaining in the DOM. In the preview shown in FIG. 3C, an intermediate page (page 3) of growing widget 336 is being displayed in growing widget 336 and therefore a viewer may navigate forward and backwards within the pagination of the growing widget. In some embodiments, the illustrated design time preview indicates that the growing widget 366 will be instructed to expand to fill the space available in the window in which table widget 336 is rendered.

Figure 4:
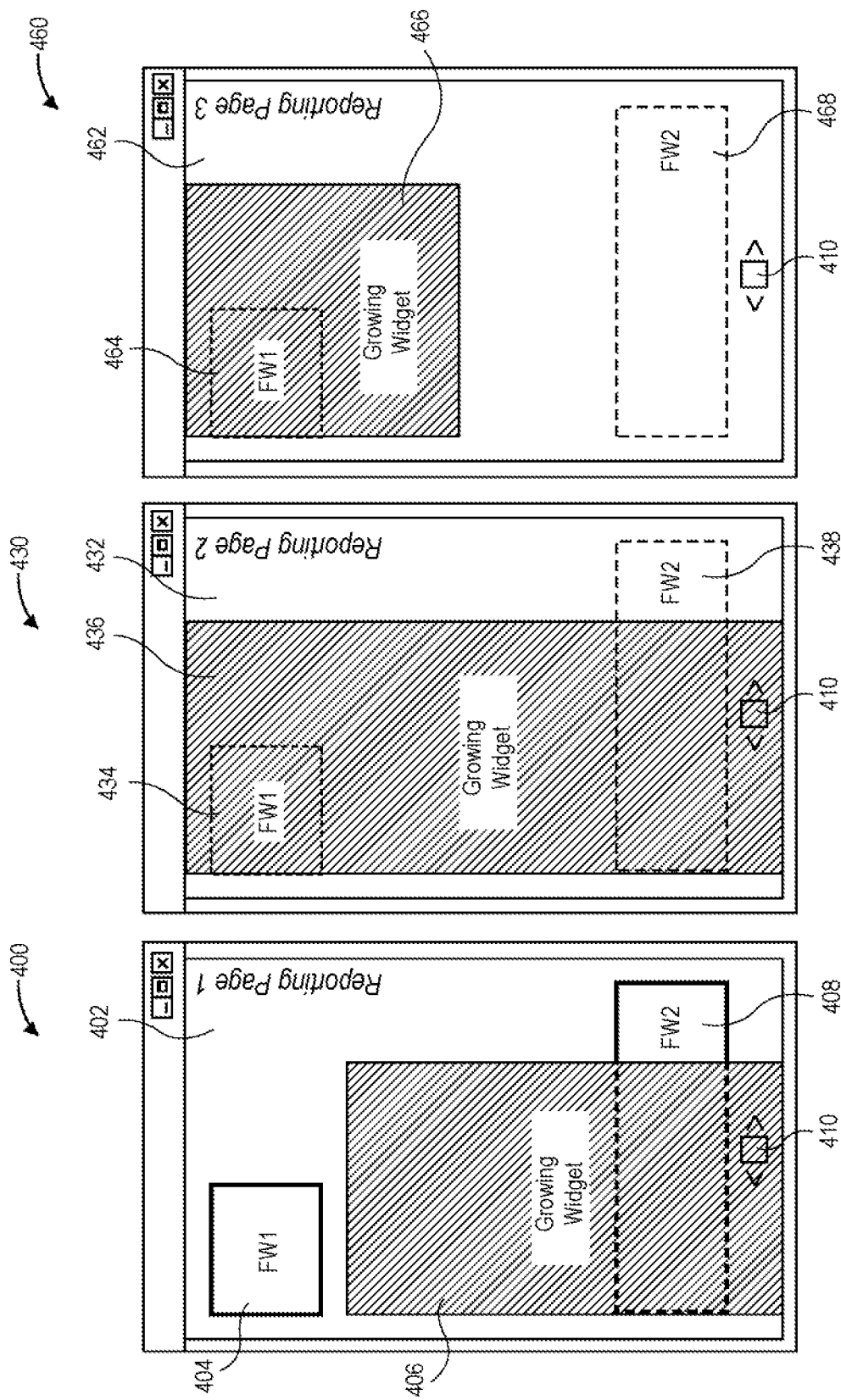
FIGS. 4A-4C depict exemplary user interface components for viewing and interacting with reports and/or analytics, including paginated growing widgets.

Turning now to FIG. 4A, an exemplary user interface component for interacting with view-time analytics including one or more paginated widgets is depicted and referred to generally by reference numeral 400. User interface component 400 provides a mechanism for viewing widget data starting from an initial page, starting from widget data index zero of the associated widget data. The view-time analytics is rendered in exemplary graphical user interface window 402. At the upper left of user interface window 402 is emplaced fixed widget 404. In some embodiments, when an initial page is being displayed, the page is rendered starting from a design time top of a growing widget such as growing widget 406 as illustrated in FIG. 4A. As shown, growing widget 406 expands to the bottom of user interface window 402, partially covering up fixed widget 408. In some embodiments, pagination control set 410 is displayed at the bottom of user interface window 402. In some embodiments, pagination control set 410 is translucent so as not to obscure the report contents. In some embodiments, pagination control set 410 is hidden in the event that growing widget encounters a user engagement event such as a mouse or other stylus moving over its display area or in the context of a touch screen when a tap or touch is received over a display area of pagination control set 410.

In some other embodiments, pagination control set 410 is not displayed, for example when no pagination is necessary, e.g. the underlying data of all growing widget can fit in one page. In some embodiments, user interface window 402 is rendered on a device with a touch screen and user pagination input is provided by way of touch screen gestures such as swiping right or left. In some embodiments, pagination control set 410 contains a left-arrow to return to the previous page, a right-arrow to advance to the next page, and a text box page number selector into which an absolute page number may be input to jump or navigate directly to the page corresponding to the absolute page number. In some embodiments, a first page and a last page indicator (not shown) are provided to navigate to the first page and the last page, respectively, of a corresponding paginated widget. In some embodiments, pagination control set 410 is associated with multiple growing widgets within user interface window 402. In this embodiment, navigating to the last page associated with the multiple growing widgets involves navigating to the last page computed as the page which allows display of the final subset of the of the largest dataset associated with the growing widgets. In some embodiments, growing widgets whose dataset has been exhausted in a page prior to the page associated with the final subset of the of the largest dataset associated with the growing widgets will not be displayed because those widgets have no data to be displayed having a widget index corresponding to that page. It is understood that other pagination controls may be employed without departing from the scope of the present teachings.

FIG. 4B illustrates user interface component 430, which is displaying a second reporting page such that the growing widget expands upwardly and downwardly to fill the entire vertical extent of user interface window 432. Fixed widget 434 is located at the upper left of user interface window 432 but fully covered up by growing widget 436. Because fixed widget 438 is only displayed on the first page of the report, it is hidden in FIG. 4B. Nevertheless, fixed widget 438 is shown in light dashed lines to represent the fact that it is merely hidden and not removed from the DOM. In some embodiments, optional pagination control set 410 is displayed at the bottom of user interface window 432. As noted above, various pagination controls may be provided.

FIG. 4C illustrates a user interface component 460 that corresponds to a situation in which a third reporting page contains a final subset of data at the end of the last dataset associated with the growing widget 466, and not enough items are present in the final subset to fully expand growing widget 466 to the bottom of user interface window 462. In this case, fixed widget 464 is located at the upper left of user interface window 462 but fully covered up by growing widget 466. Because fixed widget 468 is only displayed on the first page of the report, it is hidden in FIG. 4C. Nevertheless, fixed widget 468 is shown in light dashed lines to represent the fact that it is merely hidden and not removed from the DOM. In some embodiments, optional pagination control set 410 is displayed at the bottom of user interface window 462. In this case, pagination control set 410 may optionally be more prominently and continually displayed since growing widget 466 would not extend to the bottom of user interface window 462 and therefore pagination control set 410 does not interfere with a bottom portion of growing widget 466. As noted above, various pagination controls may be provided.

Figure 5:
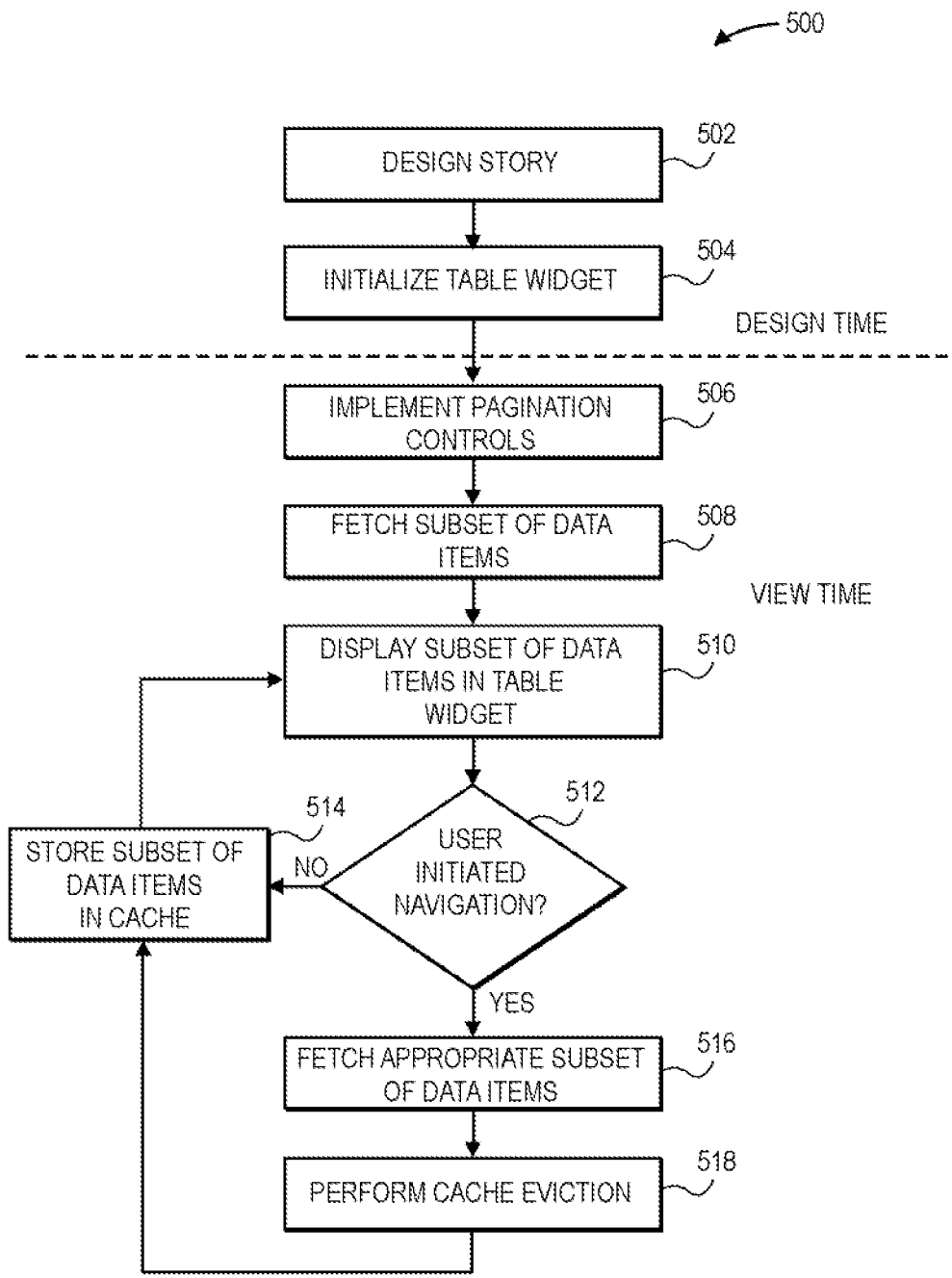
FIG. 5 depicts an exemplary flowchart illustrating the operation of a method in accordance with various embodiments.

Turning now to FIG. 5, an exemplary flowchart illustrating the operation of a method in accordance with certain embodiments is depicted and referred to generally by reference numeral 500. The embodiments described in connection with FIG. 5 relate to growing table widgets which are only one example of a growing widget as described herein. Initially, at step 502, a story page is designed in which a report-like view is generated in connection with a report designing user interface such as the design-time interface disclosed in connection with FIGS. 3A-3C. In some embodiments, a story may be created by an analytics designer and can be made up of various widgets with associated configurable functionality. In some embodiments a story design user interface allows the design of analytics for presentation on mobile devices with responsive layouts. In these embodiments, a corresponding screen size for various mobile devices is mapped to scale analytics components such as charts, so that size and layout of the analytics components are aligned based on the size of the mobile device screen. In some embodiments, when creating a story with a responsive layout, initially two lanes may be present. In some embodiments, additional lanes may be added in a single layout row as well as additional lanes in a screen layout column. In these embodiments, each lane occupies space of a predetermined number of grid spaces. Associated lanes determine the arrangement of the components on various devices i.e., components within a lane will stay together. In some embodiments, lanes are displayed sequentially, while widgets are displayed from left to right and top to bottom. In some embodiments, a responsive layout auto adjusts the width and height of a particular analytics component based on a tile size that is proportionate to the screen size of the mobile or other display device. Next, at step 504, a table widget is initialized and added to the design time preview. In some embodiments, this step involves initializing an empty table widget placed in the window based on a placement as specified in the corresponding model. In some embodiments, a pagination service associated with the table widget is also initialized. In these embodiments, the pagination service performs a bounds negotiation process as explained below to facilitate a design time preview of the report being designed.

When a user accesses a report or analytics package at view time to view and interact with the analytics, a user interface window corresponding to the report is initially rendered according to a model associated with the report as it was designed and optionally previewed in the previous steps. Widgets associated with the report model are rendered within the window. In some embodiments, a handshaking negotiation procedure is orchestrated by the pagination service. Based on the size of the corresponding user interface region or window in which the report is being displayed, the pagination service has information about available space for rendering the table widget. The widget can be queried for information regarding its contents. The pagination service asks each table widget within a report about how many rows can be fully displayed in a specific area. The service keeps the proposed area updated between calls depending on pagination changes and the number of rows a table widget can display. If the user interface region or window is resized or if a rotatable client device is rotated, thereby changing the available space for rows to be displayed in the table widget, the pagination service will re-initiate a bounds negotiation with the table widget.

Next, at step 506, pagination controls associated with the generated table widget are implemented. In some embodiments, pagination controls are implemented as in exemplary pagination control set 410 (of FIG. 4A), which may be displayed at the bottom of the associated user interface window. In some embodiments, the pagination control set may be translucent so as not to obscure report contents. In some embodiments, the pagination control set is hidden unless the table widget encounters a user engagement event such as a mouse or other stylus moving over a display area of the table widget or in the context of a touch screen when a tap or touch is received over a display area of the table widget. In some other embodiments, a pagination control set is grayed-out when, for example, only a single page of data is displayed, such as in the case of a small data set or an aggressive filter. In other embodiments, the pagination set is not displayed, for example when user interface window is rendered on a device with a touch screen and user pagination input is provided by way of touch screen gestures such as swiping right or left.

As noted in connection with FIG. 4A above, in some embodiments, pagination control set contains a left-arrow to return to the previous page, a right-arrow to advance to the next page, and a text box page number selector into which an absolute page number may be input to jump or navigate directly to the page corresponding to the absolute page number. In some embodiments, a first page and a last page indicator (not shown) are provided to navigate to the first page overall and the last page of the largest overall dataset among the plurality of growing widgets in the report. It is understood that other pagination controls may be employed without departing from the scope of the present teachings.

Next, at step 508, a subset of data items is fetched from one or more data sources. In some embodiments, an analytics agent may provide an interface for data contained in a relational database management system, a data warehouse, or any other source of data, whether in the cloud or on-premise. Such an analytics agent server may be directly connected to the data sources. Alternatively, the data sources may be connected via a network.

Next, at step 510, the subset of data items is displayed in the table widget. At test 512, it is determined whether a user-initiated page navigation event has occurred that would result in a pagination change. If a user-initiated page navigation event has not occurred, at step 514, the subset of pagination metadata is stored in a cache associated with the table widget. On the other hand, if a user-initiated page navigation has occurred, execution proceeds on to step 516. At step 516, the next subset of data items is fetched.

Next, at step 518, any necessary cache eviction operations are performed. In some embodiments, where there is adequate available space in the cache, this step can be skipped. In some embodiments, when the cache is full, and space needs to be made for a freshly obtained subset of pagination metadata, one or more blocks of data associated with one or more cached reporting pages may be purged from the cache to make room for the new pagination metadata. Next, when there is space in the cache, execution continues on to step 514 where, as described above, the subset of pagination metadata is stored in the cache. Finally, execution continues at step 510 where, as described above, the subset of retrieved data items is displayed in the table widget.

Figure 6:
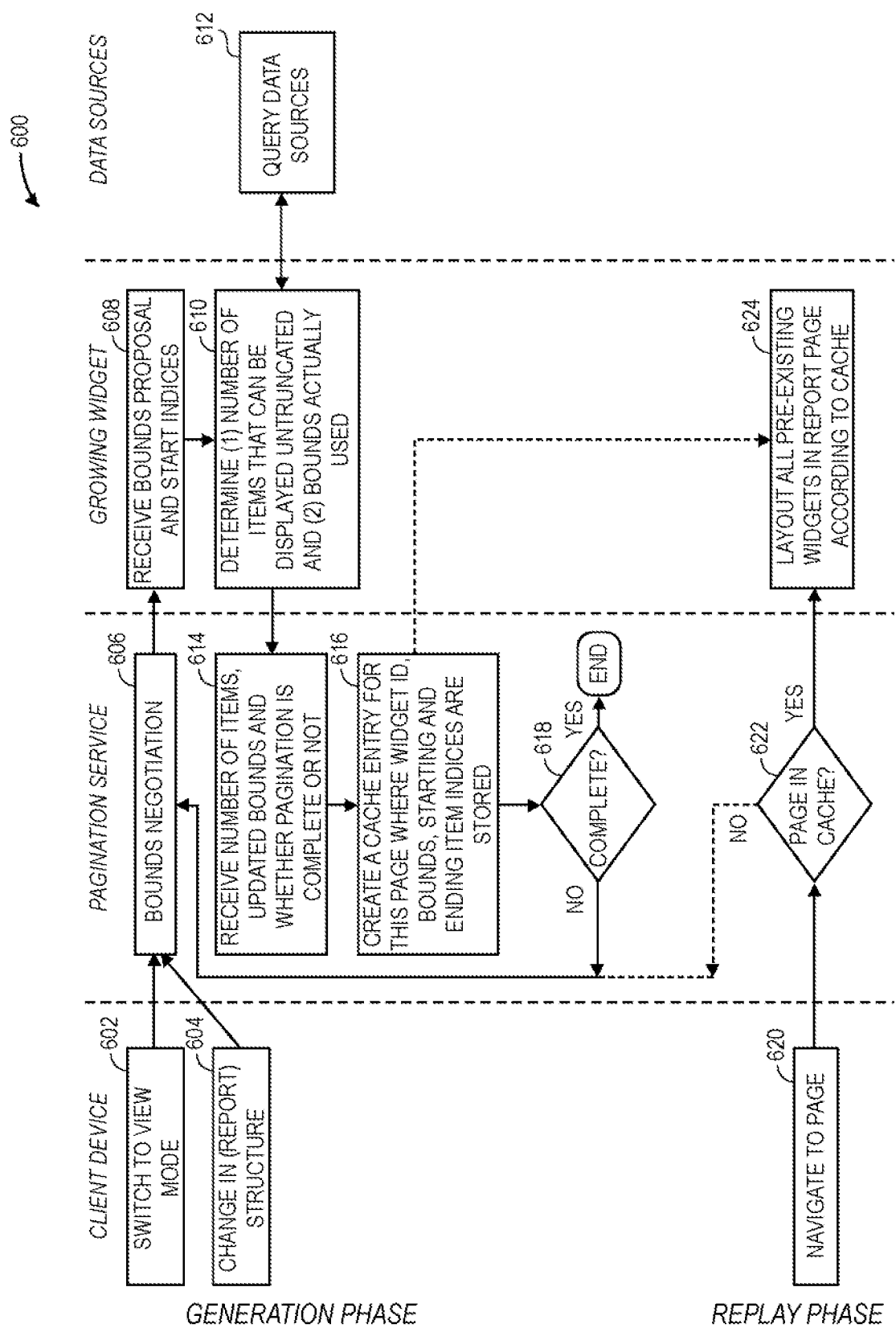
FIG. 6 depicts an exemplary swim lane diagram for illustrating the operation of a method in accordance with various embodiments.

Turning now to FIG. 6, an exemplary swim lane diagram is depicted illustrating the operation of an exemplary cloud analytics platform in accordance with certain embodiments. The swim lane diagram is referred to generally by reference numeral 600. A generation phase process begins at step 602 when a client device switches to view mode for viewing a report or set of analytics or when a client otherwise initiates viewing of a story page, the story page having been designed as explained above. When a viewing user initiates the view mode of a report containing at least one growing widget, the viewing process entails opening a user interface region or window in a front-end display application and initializing an initial set of widgets associated with the report.

Similarly, at step 604, the generation phase may be initiated when there is a change in the structure of the report or analytics. Such a structural change could take the form of filtering the underlying data or expanding or contracting a tree-structure hierarchy, both of which would change the scope of the dataset underlying one or more of the growing widgets being viewed in the report.

At step 606, a pagination service associated with one or more growing widgets contained within the report initiates bounds negotiations to determine how many items per page the one or more growing widgets can display. In some embodiments, a handshaking negotiation procedure is orchestrated by the pagination service. Based on a widget bounds range, in terms of height and width, of the corresponding user interface region in which the report is being displayed, the pagination service has information about available space for rendering the growing widget. In some embodiments, the pagination service transmits this widget bounds range information along with a starting widget data index to the growing widget.

At step 608, the growing widget receives this bounds proposal, including the starting widget data item index. In some embodiments, the pagination service queries the growing widget by invoking an API call associated with the growing widget, passing to the growing widget necessary API parameters. In some embodiments the API parameters include a widget bounds region and one or more starting widget indices. In some embodiments, the front-end display application is a web browser that is capable of interpreting a scripting language such as JavaScript, TypeScript, or an Ecma International Standard scripting language. In some embodiments, the pagination service is implemented in this scripting language, and the pagination service invokes API calls associated with the growing widget by invoking a function in the scripting language.

At step 610, the growing widget determines a number of widget data items that can be displayed untruncated within the widget bounds region. In some embodiments, the growing widget requests data from one or more data sources. In some embodiments, an analytics agent may provide an interface for data contained in a relational database management system, a data warehouse, or any other source of data, whether in the cloud or on-premise. Such an analytics agent server may be directly connected to the data sources. Alternatively, the data sources may be connected via a network. At step 612, the one or more data sources queries data from a repository associated with the data sources and transmits the results of the data query back to the growing widget. Based on this received query data, the growing widget can determine the number of data items available to display. The growing widget can also determine the space within the bounds region that will be actually used in displaying the number of data items that will fit in the widget bounds region. The subset of widget data items that can fit in the widget bounds region will typically be less than the full set of data items in the complete widget dataset. In the case that the subset contains more data than can fit in the widget bounds region, the growing widget will determine that the entire bounds can be used. On the other hand, if the amount of data in the full widget dataset can be displayed without filling up the entire bounds then the growing widget determines how many data items can be displayed and that the growing widget did not take up the entire widget bounds region. In either case, the growing widget determines an updated bounds region based on how much of the proposed widget bounds region is actually used.

At step 614, the pagination service receives the number of items that can displayed by the growing widget. The pagination service also receives the updated bounds as determined in the previous step. Finally, the pagination service also receives from the growing widget an indication of whether pagination is complete or not, i.e. whether the entire widget dataset has been displayed on that page within the updated bounds of the growing widget.

At step 616, the pagination service creates a cache entry for the corresponding page number in the report. In some embodiments, the cache entries are blocks of metadata that are collected in a cache such as a JSON list or other JSON entity. In some embodiments, the cache entry contains a widget identifier, the updated widget bounds, and starting and ending widget data item indices. In these embodiments, the widget identifier is stored so that corresponding bounds and index information can be persisted for a plurality of widgets associated with a particular page of a report. In addition to storing the widget identifier in the cache, the updated (actual) bounds used by a corresponding growing widget when displaying that particular page are stored. In some embodiments a starting and ending index are stored, corresponding to the particular page. In some other embodiments, a starting widget data index is stored with a number of items displayed in the growing widget on that particular page. In some embodiments, once the pagination service has obtained sufficient information to determine the actual bounds of each widget in a particular report, the pagination service may invoke API calls corresponding to each of the widgets instructing them to render themselves in the report (step 624 further described below).

At test 618, it is determined whether the complete dataset has been displayed, corresponding to the final subset of the of the largest dataset associated with the growing widgets in the report. If the complete dataset has not been displayed, bounds negotiation proceeds at step 606 as described above. In some embodiments, the generation phase occurs and the page cache is updated only when a viewing user navigates to a particular page. In some other embodiments, the generation phase executes in the background filling out the page cache one page at a time looping through the generation phase processing as described above.

At step 620, a user navigates to an arbitrary page. In some embodiments, user pagination input is received in connection with pagination controls that are implemented as in exemplary pagination control set 410 (of FIG. 4A), which may be displayed at the bottom of the associated user interface window. As noted above, in some embodiments, the pagination control set may be translucent so as not to obscure report contents. In some other embodiments, a pagination control set is not displayed, for example when user interface window is rendered on a device with a touch screen and user pagination input is provided by way of touch screen gestures such as swiping right or left.

If the complete dataset has been displayed, and the page cache is complete, the generation phase processing ends. In parallel, the replay phase proceeds to test 622, which determines whether the current page is in the cache. In the initial path, the cache entry will just have been updated so it will be present in the cache. Typically, when a report is viewed for the first time, the report will begin at the first page. In some embodiments, a current page is persisted in connection with report configuration parameters and when switching to view mode, the report will begin at the persisted page, which may be a page other than the first page of the report. If at test 622, the page is not in the cache, bounds negotiation proceeds at step 606 as described above. Finally, at step 624, the growing widgets each layout their corresponding widget display elements according to the corresponding widget data items, the growing widgets having already accessed data from corresponding data sources at steps 610 and 612.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for populating and rendering one or more paginated growing widgets in a front-end display application, the method comprising:
   causing a pagination service to perform a widget bounds negotiation with each of the paginated growing widgets for at least one page in a paginated report, the widget bounds negotiation comprising steps of:
      creating a widget pagination cache entry in a widget pagination cache, the cache entry including: a widget identifier corresponding to each of the paginated growing widgets, an updated widget bounds, a starting widget data item index and an ending widget data item index;
      responsive to a user page navigation event, navigating the paginated report to a particular page, determining whether the particular page is present in the widget pagination cache;
      causing the pagination service to perform the widget bounds negotiation for the particular page where the particular page is not present in the widget pagination cache; and
      instructing each of the paginated growing widgets to render updated widget data items based on a corresponding widget pagination cache entry.

2. The non-transitory computer-readable media of claim 1, wherein the front-end display application is a web browser.

3. The non-transitory computer-readable media of claim 1, wherein the computer-executable instructions, when executed by the processor, further perform the method, the method further comprising causing the front-end display application to implement pagination controls comprising:
   causing the front-end display application to graphically render pagination user interface components corresponding to the pagination controls, the pagination user interface components comprising:
   a previous-page selector;
   a jump-to-numbered-page selector; and
   a next-page selector.

4. The non-transitory computer-readable media of claim 1, wherein the computer-executable instructions, when executed by the processor, further perform the method, the method further comprising causing the front-end display application to implement pagination controls comprising:

causing the front-end display application to receive and process touch gestures corresponding to pagination user interface actions, the pagination user interface actions comprising:
return to a previous-page; and
advance to a next-page.

5. The non-transitory computer-readable media of claim 1, wherein the front-end display application is rendered on a generally rectangular display device having a height, a width, and one or more display orientations, and wherein based on a selected new display orientation resizing and rendering the paginated widget based on an updated vertical widget bounds range associated with new vertical bounds of a window associated with the front-end display application in which the paginated growing widget is rendered in the new orientation.

6. The non-transitory computer-readable media of claim 1, wherein instructing each of the paginated growing widgets to render updated widget data items based on a corresponding widget pagination cache entry comprises:
instructing each of the paginated growing widgets to request a set of current widget data items from a back-end data source based on the starting widget data item index and the ending widget data item index.

7. The non-transitory computer-readable media of claim 1, wherein causing the pagination service to perform the widget bounds negotiation with each of the paginated growing widgets further comprises:
performing, in background execution, the widget bounds negotiation with each of the paginated growing widgets for pages that are not yet present in the widget pagination cache.

8. A method for displaying, in a front-end display application, a paginated report having at least one growing table widget, the method comprising:
causing a pagination service to perform a widget bounds negotiation with the growing table widget for at least one page in the paginated report, the widget bounds negotiation comprising steps of:
creating a report pagination cache entry in a report pagination cache, the cache entry including: a widget identifier corresponding to the growing table widget, an updated table bounds, a starting table row and an ending table row;
responsive to a user page navigation event, navigating the paginated report to a particular page, determining whether the particular page is present in the report pagination cache;
causing the pagination service to perform the widget bounds negotiation for the particular page where the particular page is not present in the report pagination cache; and
instructing the growing table widget to render updated table data items based on a corresponding report pagination cache entry.

9. The method of claim 8, wherein the method further comprises causing the front-end display application to implement pagination controls comprising:
causing the front-end display application to graphically render pagination user interface components corresponding to the pagination controls, the pagination user interface components comprising:
a previous-page selector;
a jump-to-numbered-page selector; and
a next-page selector.

10. The method of claim 8, wherein instructing the growing table widget to render updated table data items based on a corresponding report pagination cache entry comprises:
instructing the growing table widget to request a set of data table rows from a back-end data source based on the starting table row and the ending table row; and
instructing the growing table widget to receive the set of data table rows.

11. The method of claim 8, wherein causing the pagination service to perform the widget bounds negotiation with the growing table widget further comprises:
performing, in background execution, the widget bounds negotiation with the growing table widget for pages that are not yet present in the report pagination cache.

12. The method of claim 8, wherein the report pagination cache employs a cache eviction strategy based on a least recently used set of table metadata items stored in the report pagination cache.

13. The method of claim 8, wherein the table data item cache is a JavaScript Object Notation (JSON) list of JSON objects corresponding to a cached subset of metadata items.

14. The method of claim 8, wherein the front-end display application comprises a web browser application adapted to interpret a scripting language capable of updating data associated with components rendered within the web browser, the scripting language adapted to selectively refresh portions of the components rendered within the web browser, based on user pagination interaction, without reprocessing a document object model associated with an application session of the web browser application.

15. A system comprising at least one processor and at least one non-transitory memory storing computer executable instructions that when executed by the processor cause the system to carry out actions comprising:
transmitting, to a front-end user device, computer executable instructions to cause a front-end display application to cause a pagination service to perform a widget bounds negotiation with a plurality of paginated growing composite widgets for at least one page in a paginated report, the widget bounds negotiation comprising steps of:
creating a widget pagination cache entry in a widget pagination cache, the cache entry including: a widget identifier corresponding to each of the paginated growing composite widgets, an updated widget bounds, a starting widget data item index and an ending widget data item index;
responsive to a user page navigation event, navigating the paginated report to a particular page, determining whether the particular page is present in the widget pagination cache;
transmitting, to a front-end user device, computer executable instructions to cause the pagination service to perform the widget bounds negotiation for the particular page where the particular page is not present in the widget pagination cache; and
transmitting, to a front-end user device, computer executable instructions to instruct each of the paginated growing widgets to render updated widget data items based on a corresponding widget pagination cache entry.

16. The system of claim 15, wherein transmitting, to a front-end user device, computer executable instructions to cause the front-end display application to implement pagination controls further comprising:

transmitting, to a front-end user device, computer executable instructions to cause the front-end display application to graphically render pagination user interface components corresponding to the pagination controls, the pagination user interface components comprising:
a previous-page selector;
a jump-to-numbered-page selector; and
a next-page selector.

17. The system of claim 15, wherein transmitting, to a front-end user device, computer executable instructions to cause a front-end display application to cause the pagination service to perform the widget bounds negotiation with the growing composite widget further comprises:
performing, in background execution, the widget bounds negotiation with the growing composite widget for pages that are not yet present in the widget pagination cache.

18. The system of claim 15, wherein the composite widget pagination cache employs a cache eviction strategy based on a least recently used set of composite widget metadata stored in the widget pagination cache.

19. The system of claim 15, wherein the widget pagination cache is a JavaScript Object Notation (JSON) entity comprising JSON objects.

20. The system of claim 15, wherein the front-end display application is a web browser application adapted to interpret a scripting language adapted to update the composite widgets, based on user navigation interaction, without reprocessing a document object model associated with an application session of the web browser application.

* * * * *